L. S. LACHMAN.
ELECTRIC SPOT WELDING APPARATUS.
APPLICATION FILED JULY 14, 1915.

1,176,762.

Patented Mar. 28, 1916.

WITNESSES

INVENTOR
Laurence S. Lachman
BY
Townsend & Decker
ATTORNEYS

UNITED STATES PATENT OFFICE.

LAURENCE S. LACHMAN, OF NEW YORK, N. Y.

ELECTRIC SPOT-WELDING APPARATUS.

1,176,762.  Specification of Letters Patent.  Patented Mar. 28, 1916.

Application filed July 14, 1915. Serial No. 39,763.

*To all whom it may concern:*

Be it known that I, LAURENCE S. LACHMAN, a citizen of the United States, and a resident of New York, in the county of New York and State of New York, have invented certain new and useful Improvements in Electric Spot-Welding Apparatus, of which the following is a specification.

My invention relates to electric welding machines in which transformers are employed for supplying the heating current to the work and more particularly to machines adapted to make a weld at any point over the surface of a sheet or plate of metal having a large superficial area.

The special object of my invention is to provide an apparatus whereby a great heating effect may be produced at the desired point of weld, thereby enabling heavy work to be done while at the same time permitting the weld to be made at any point, while at the same time the work is in such position with relation to the transformers as to avoid objectionable induction in the work. These ends are secured by the employment of two welding transformers arranged respectively at opposite sides of the work but each wholly to one side thereof and by such organization and arrangement of the secondary terminals or electrodes of the machine as to permit all the energy of both transformer secondaries to be applied to the work of making a single weld.

Figure 1:
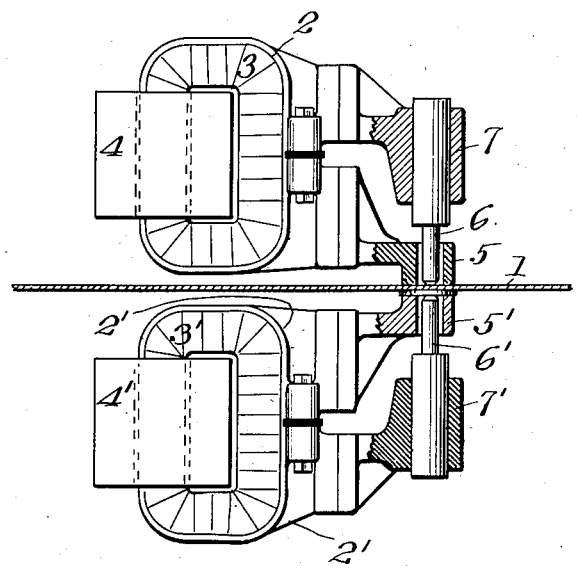
Figure 2:
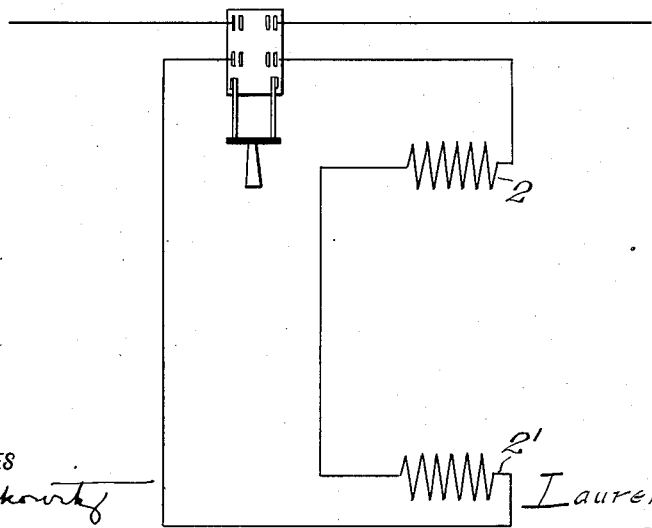

In the accompanying drawings Figure 1 is a general side elevation and partial vertical section illustrating an arrangement of transformers and secondary terminals thereof devised by me for the purpose of carrying out my invention. The mounting of the transformers themselves and the particular means employed for moving the upper one of them or both of them, should it be so desired, toward and from the work, are not shown, as they may be of any desired form and can be readily supplied by any mechanic. Fig. 2 is a diagram of the circuits of the primaries of said transformers.

1 indicates the work which may be, for instance, two plates of sheet metal to be welded together at a spot in their opposed surfaces.

2 indicates the secondary of one welding transformer, 3 the primary thereof and 4 the usual sheet metal core. The said secondary terminates in electrodes 5 and 6, the latter of which is movable to and from the work in a mounting 7 constituting a part of the secondary to permit its end to be brought into engagement with the work and to apply the desired welding pressure at the spot of welding. The electrode or terminal 5 may be, if desired, solid and integral with the secondary bar, its application to the work being secured by moving the transformer bodily toward the surface of the metal plate 1. The said electrode 5 preferably surrounds the electrode 6 but of whatever shape it be it is arranged so that it will engage the work in close proximity to the point of engagement of the electrode 6 without, however, making actual contact with the latter.

The whole transformer so far described and the working parts thereof are arranged wholly at one side of the work 1. A similar transformer arranged wholly at the opposite side of the work and having its electrodes disposed in line with the electrodes of the transformer described is shown below. The parts thereof are numbered in a similar way but with a distinguishing prime mark. The primaries of said transformers as indicated in the diagram Fig. 2 may be and preferably are arranged in series and are supplied with energy from suitable means whose connection with said secondaries may be controlled by a switch. The energy of said secondaries flows in series from one electrode 5 to the other 5' and through the work and also in series from one electrode 6 to the other 6', the effect being that the heating energy flows through the work at two gaps in the series circuit thereof and that the energy liberated in both gaps is applied to heat the same part to be welded. There is also more or less flow of current from one electrode 5 to the other electrode 6 of the same transformer but, whatever be the distribution of current of the secondaries through the work it will be obvious that the energy of both transformers is practically focused or concentrated in heating the same weld.

In the operation of applying the transformers to the spot or point to be welded it is obvious that the lower transformer may be at all times fixed, the work resting in such case upon the electrode 5' and that the electrode 6' being movable in the head or sleeve 7', may be brought firmly up into engagement with the work, thereby compensating for any irregularities at the point of weld.

The electrode 5 of the opposite transformer may be applied firmly in engagement with the work by moving the transformer or any part thereof carrying the electrode 5 down upon the work and immediately over the opposite transformer electrode 5', while subsequently the independent movement of the electrode 6 secures full engagement of all the electrodes at the point to be welded and permits the weld to be effected by the pressure exerted by said electrode 6 at the proper time.

As will be obvious to those skilled in the art, a machine organized according to my invention lends itself particularly to use in the making of spot welds at any point or points in the surface of sheets of metal of indefinitely large area.

What I claim as my invention is:—

1. In an electric welding apparatus, the combination of two welding transformers each arranged wholly to one side of the work, said transformers having their four secondary terminals converging in the same work gap to heat the work by the concentrated effect of the heating current from both secondaries flowing across the same work gap in series from one to the other and in multiple between the terminals of said secondaries respectively.

2. In an electric welding apparatus, the combination of two welding transformers arranged respectively at opposite sides of the work and both having both electrodes adapted to be applied to the work at the same weld so as to heat the work by the combined effect of the current of the secondaries flowing through the work at two juxtaposed gaps in the series circuit thereof and flowing from one terminal to the other of said secondaries respectively in multiple.

3. In an electric welding apparatus, the combination of two transformers having electrodes adapted to be applied to the work at opposite sides thereof and at substantially the same point to be welded so as to focus or concentrate the heating effect of the current of both secondaries in the same weld due to the flow of current in series from both secondaries across two juxtaposed circuit gaps and in multiple from one terminal to the other of each secondary.

4. In an electric spot welding machine, the combination of two transformers each having a welding and heating electrode forming one terminal of a secondary and a coöperating heating electrode forming the opposite terminal of said secondary and surrounding the first-named electrode, said transformers being disposed wholly at opposite sides of the work with their secondary terminal electrodes arranged in line and coöperating to heat the part to be welded by current flowing in series through said secondaries across the gap and directly from one electrode to the other of each transformer operating in multiple.

5. In an electric welding apparatus, the combination of two welding transformers located respectively at opposite sides of the work and each having both terminals adapted to be applied to the same part of the work to permit all the energy of both to be applied to the making of the same weld by heating the same through the effect of current flowing across two gaps in the series circuit of said transformers' secondaries and in multiple from said secondaries across the gaps between the terminals of said secondaries respectively, each said transformer having for one terminal a welding electrode movable in the secondary and for the other a ring-shaped piece surrounding the first as and for the purpose described.

6. In an electric welding apparatus, the combination substantially as described, of two transformers arranged respectively at opposite sides of the work and each having both electrodes adapted to be applied to the work to heat the same weld by the energy of both transformers operating in series and likewise in multiple, one of the electrodes of each transformer being movable in relation to the work independently of the other.

7. In an electric welding apparatus, the combination of two welding transformers each arranged wholly to one side of the work but at opposite sides thereof respectively, and operating to heat the same point of work in series and likewise in multiple, said transformers having secondaries terminating in electrodes one of which is movable to effect the weld while the other surrounds the first and is adapted for application to the work to supply heating current thereto at the point where the weld is effected by the first-named electrode.

Signed at New York, in the county of New York and State of New York, this 12th day of July, A. D. 1915.

LAURENCE S. LACHMAN.

Witnesses:
　IRENE LEPKOWITZ,
　F. B. TOWNSEND.